US012698784B2

(12) United States Patent
Chen et al.

(10) Patent No.: US 12,698,784 B2

(45) Date of Patent: Aug. 4, 2026

(54) QUICK-ASSEMBLY AND ANTI-FALLING STRUCTURE FOR FAN BLADES OF A CEILING FAN

(71) Applicant: United Electric (GuangDong) Co., Ltd, Taishan (CN)

(72) Inventors: Ganlin Chen, Taishan (CN); Zhentang Li, Taishan (CN); Jixian Xie, Taishan (CN)

( * ) Notice: Subject to any disclaimer, the term of this patent is extended or adjusted under 35 U.S.C. 154(b) by 0 days.

(21) Appl. No.: 18/958,418

(22) Filed: Nov. 25, 2024

(65) Prior Publication Data

US 2026/0146625 A1 May 28, 2026

(51) Int. Cl.

*F04D 29/34* (2006.01)
*F04D 19/00* (2006.01)
*F04D 25/08* (2006.01)
*F21V 33/00* (2006.01)

(52) U.S. Cl.

CPC ........... *F04D 29/34* (2013.01); *F04D 19/002* (2013.01); *F04D 25/088* (2013.01); *F21V 33/0096* (2013.01)

(58) Field of Classification Search

CPC ........ F04D 25/088; F04D 29/34; F04D 29/36; F21V 33/0096

See application file for complete search history.

(56) References Cited

U.S. PATENT DOCUMENTS 6,059,531 A * 5/2000 Tai .......................... F04D 29/34 416/207
6,378,824 B1 * 4/2002 Tseng ...................... F04D 29/34 248/220.21
11,486,412 B1 * 11/2022 Peterson ............... F04D 25/088
12,188,482 B1 * 1/2025 Licai ........................ F04D 29/34
12,203,478 B1 * 1/2025 Guo ......................... F04D 29/34
2002/0027183 A1 * 3/2002 Tseng ....................... F04D 29/34 248/220.21
2003/0219340 A1 * 11/2003 Hidalgo .................. F04D 29/34 416/207
2003/0228224 A1 * 12/2003 Lee ....................... F04D 25/088 416/206

(Continued)

FOREIGN PATENT DOCUMENTS

CN 207795642 U * 8/2018

OTHER PUBLICATIONS

English machine translation of CN-207795642-U, Mar. 26, 2025.*

*Primary Examiner* — Christopher Verdier

(57) ABSTRACT

A quick-assembly and anti-falling structure for fan blades of a ceiling fan, comprising a main unit, a suspension part fixed above the main unit, and a central ring installed below or around the main unit, the main unit is provided with a motor, an inner side wall of the central ring is provided with mounting inclined surfaces, the mounting inclined surface is provided with a mounting inclined groove on an outer side wall of the central ring, the mounting inclined groove is arranged parallel and opposite to the inclined surface; further comprising fan blades, one end of the fan blade is inserted into the mounting inclined groove; the mounting inclined surface is provided with an inclined press cover, a an engagement member base is fixedly arranged on the inclined press cover, the engagement member base is movably provided with a movable engagement member.

6 Claims, 3 Drawing Sheets

(56) References Cited

U.S. PATENT DOCUMENTS

| | | | | |
|---|---|---|---|---|
| 2004/0057831 | A1 * | 3/2004 | Lin | F04D 29/34 416/210 R |
| 2017/0037869 | A1 * | 2/2017 | Zauhar | F04D 25/088 |
| 2017/0350414 | A1 * | 12/2017 | Wang | F04D 25/088 |

* cited by examiner

QUICK-ASSEMBLY AND ANTI-FALLING STRUCTURE FOR FAN BLADES OF A CEILING FAN

1. TECHNICAL FIELD

The invention relates to the technical field of fan blade installation, in particular to a quick-assembly and anti-falling structure for fan blades of a ceiling fan.

2. BACKGROUND ART

A ceiling fan combines the functions of both a lighting fixture and a fan. It offers many advantages, such as energy efficiency, convenience, and practicality, making it highly popular among consumers.

The Chinese utility model patent with the application number CN201820197315.3 discloses a ceiling fan, which comprises a suspension part, a motor, a blade mounting part, and at least two blades; the blade mounting part comprises a rotating disk, the rotating disk is provided with a mounting base, an operation port is arranged at a bottom of a central ring, facing directly towards the mounting base. The central ring is sleeved on and is fixedly connected to the rotating disk, the blade passes through the mounting opening and is securely arranged on the mounting base. During the installation of the blades of the aforementioned ceiling fan, the blades are first inserted horizontally through the through-holes on the central ring or similar components, and then several screws are used to fix the blades onto the central ring vertically. This type of design involves multiple installation steps and a complicated process, which can easily lead to safety problems such as blade looseness or even detachment due to inadequate screw fixation.

3. SUMMARY OF THE INVENTION

In order to solve the above problems raised in the background, the invention provides a fan blade quick installation anti-slip structure of a ceiling fan lamp, which is used to overcome the shortcomings of multiple blade installation steps and complex process in the prior art, and is also used to solve the problem that the installation structure is weak and the installation fixed stability cannot be guaranteed.

The technical scheme provided by the invention is as follows:

- a quick-assembly and anti-falling structure for fan blades of a ceiling fan, comprising a main unit, a suspension part fixed above the main unit, and a central ring installed below or around the main unit, the main unit is provided with a motor, an inner side wall of the central ring is provided with mounting inclined surfaces, the mounting inclined surface is provided with a mounting inclined groove on an outer side wall of the central ring, the mounting inclined groove is arranged parallel and opposite to the inclined surface;
- further comprising fan blades, one end of the fan blade is inserted into the mounting inclined groove;
- the mounting inclined surface is provided with an inclined press cover, an engagement member base is fixedly arranged on the inclined press cover, the engagement member base is movably provided with a movable engagement member, one side of the fan blade is inserted between the mounting inclined surface and the inclined press cover, the fan blade is provided with a fan blade hole that is used in conjunction with and is movably connected to the movable engagement member.

Preferably, the engagement member seat is provided with a slot, the movable engagement member slides up and down in the slot, a spring for automatic reset is arranged between the movable engagement member and the engagement member seat.

Preferably, two sides of the inclined press cover are bent upward to form a first limiting surface and a second limiting surface, respectively; the first limiting surface and the second limiting surface have different lengths and are parallel to the inclined surface angle of the mounting inclined surface; the first limiting surface and the second limiting surface are fixedly arranged on a top of the central ring, the inclined press cover is installed parallelly below the mounting inclined surface through the first limiting surface and the second limiting surface, a groove body for fixing the fan blade is formed between the inclined press cover and the mounting inclined surface.

Preferably, the inclined press cover is provided with an inclined press hole, a top of the movable engagement member is provided with a slope-shaped engagement member inclined surface, the engagement member inclined surface sequentially passes through the inclined press hole, the fan blade hole and then abuts against the mounting inclined surface. One end surface of the inclined press cover located inside the central ring is provided with limit blocks, and the limit blocks are located between the first limit surface and the second limit surface, which serve to limit the insertion depth of the fan blade during installation. The inclined press cover is also provided with through holes, the through holes are evenly distributed around the inclined press hole, each through hole is provided with a limit engagement member for contacting the fan blade to increase the anti-falling performance.

The invention has the following technical effects and advantages:

- by utilizing the upper and lower inclined press covers and mounting inclined surfaces, groove bodies for fixing the fan blades are formed inside; through the arrangement of the movable engagement member, the fan blades are secured by the self-resetting function of the springs during use; no additional screws or structural fasteners are required for fan blade installation, making the installation convenient; it can ensure installation strength and increase the anti-falling performance.

4. BRIEF DESCRIPTION OF ACCOMPANY DRAWINGS

Figure 1:
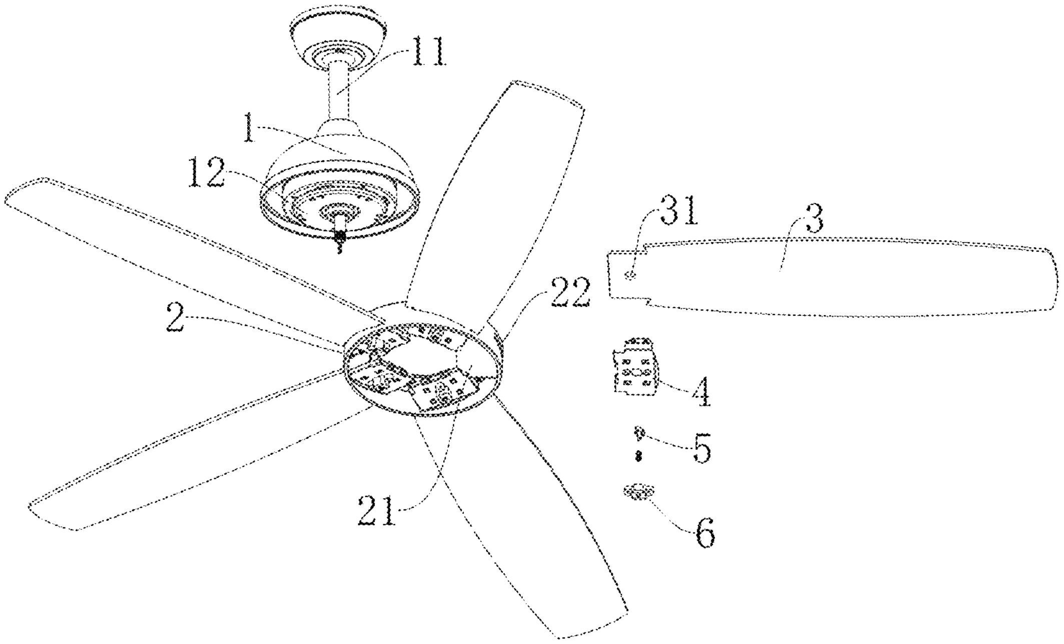
FIG. 1 is a schematic diagram of the overall structure of the quick-assembly and anti-falling structure for fan blades of a ceiling fan provided in an embodiment of the invention.

In the figures: 1 main unit, 2 central ring, 3 fan blade, 4 inclined press cover, 5 movable engagement member, 6 engagement member base, 11 suspension part, 12 motor, 21 mounting inclined surface, 22 mounting inclined groove, 31 fan blade hole, 41 inclined press hole, 42 through hole, 43 first limiting surface, 44 second limiting surface, 45 limit block, 46 limit engagement member, 51 engagement member inclined surface, 52 spring, 61 slot.

5. SPECIFIC EMBODIMENT OF THE INVENTION

The invention is further described in detail below in conjunction with the accompanying drawings and specific embodiments. The embodiments of the invention are provided for the purpose of illustration and description, and are not intended to be exhaustive or to limit the invention to the disclosed forms. Many modifications and variations are obvious to those skilled in the art. The embodiments are selected and described to better illustrate the principles and practical applications of the invention and to enable those skilled in the art to understand the invention and design various embodiments with various modifications suitable for specific purposes.

Embodiment 1

Please refer to FIG. 1, FIG. 4-FIG. 6, a quick-assembly and anti-falling structure for fan blades of a ceiling fan provided by this embodiment, comprising a main unit 1, a suspension part 11 fixed above the main unit 1, and a central ring 2 installed below the main unit 1, the main unit 1 is provided with a motor 12, an inner side wall of the central ring 2 is provided with mounting inclined surfaces 21, further comprising fan blades 3. The mounting inclined surface 21 is provided with an a mounting inclined groove 22 on an outer side wall of the central ring 2, the mounting inclined groove 22 is arranged parallel and opposite to the inclined surface 21, one end of the fan blade 3 is inserted into the mounting inclined groove 22.

Figure 2:
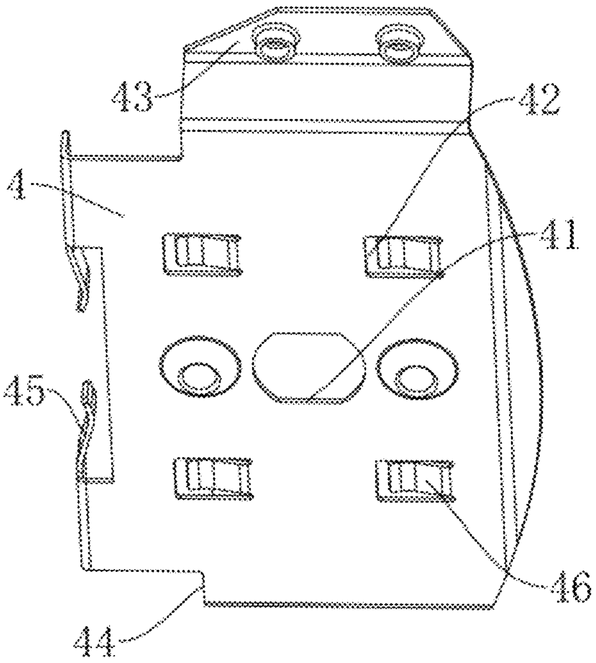
FIG. 2 is a schematic diagram of the structure of the inclined press cover in the invention.
Figure 4:
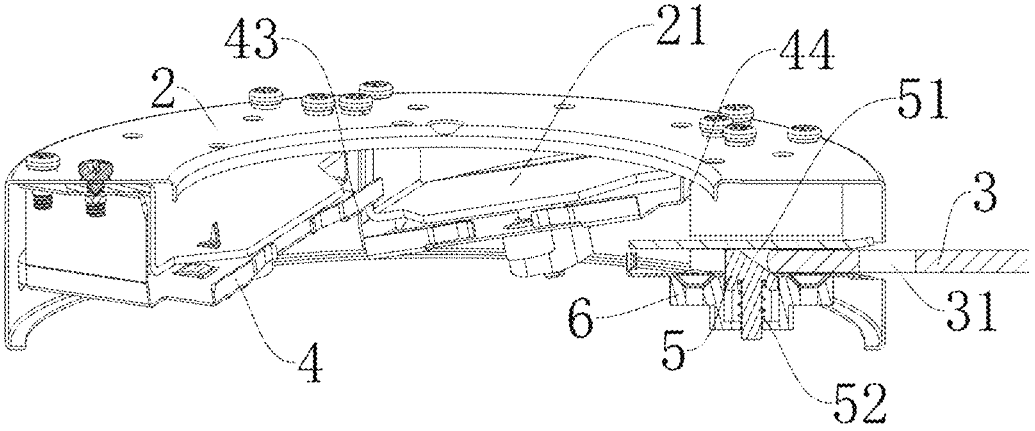
FIG. 4 is a schematic diagram 1 of the fan blade installation process provided in the embodiment of the invention.

Please refer to FIG. 1, FIG. 2, FIG. 4, the mounting inclined surface 21 is provided with an inclined press cover 4, a engagement member base 6 is fixedly arranged on the inclined press cover 4, the engagement member base 6 is movably provided with a movable engagement member 5, one side of the fan blade 3 is inserted between the mounting inclined surface 21 and the inclined press cover 4, the fan blade 3 is provided with a fan blade hole 31 that is used in conjunction with and is movably connected to the movable engagement member 5, the inclined press cover 4 is provided with an inclined press hole 41.

As shown in FIG. 4, two sides of the inclined press cover 4 are bent upward to form a first limiting surface 43 and a second limiting surface 44, respectively, the first limiting surface 43 and the second limiting surface 44 have different lengths and are parallel to the inclined surface angle of the mounting inclined surface 21, the first limiting surface 43 and the second limiting surface 44 are fixedly arranged on a top of the central ring 2, the inclined press cover 4 is installed parallelly below the mounting inclined surface 21 through the first limiting surface 43 and the second limiting surface 44, a groove body for fixing the fan blade 3 is formed between the inclined press cover 4 and the mounting inclined surface 21.

In order to improve the fixed stability of fan blade 3, referring to FIG. 2 and FIG. 4, one end surface of the inclined press cover 4 located inside the central ring 2 is provided with limit blocks 45, and the limit blocks 45 are located between the first limit surface 43 and the second limit surface 44, which serve to limit the insertion depth of the fan blade 3 during installation. The inclined press cover 4 is also provided with through holes 42, the through holes 42 are evenly distributed around the inclined press hole 41, each through hole 42 is provided with a limit engagement member 46 for contacting the fan blade 3 to increase the anti-falling performance.

Figure 3:
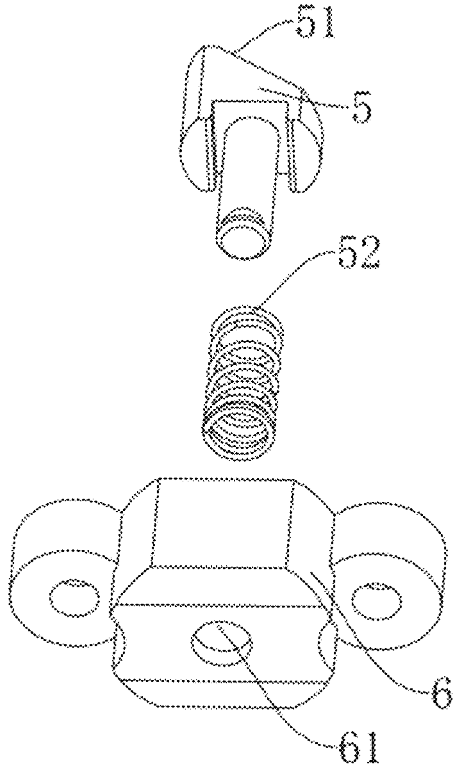
FIG. 3 is a schematic diagram of the exploded structure of the movable engagement member and engagement member base in the invention.
Figure 6:
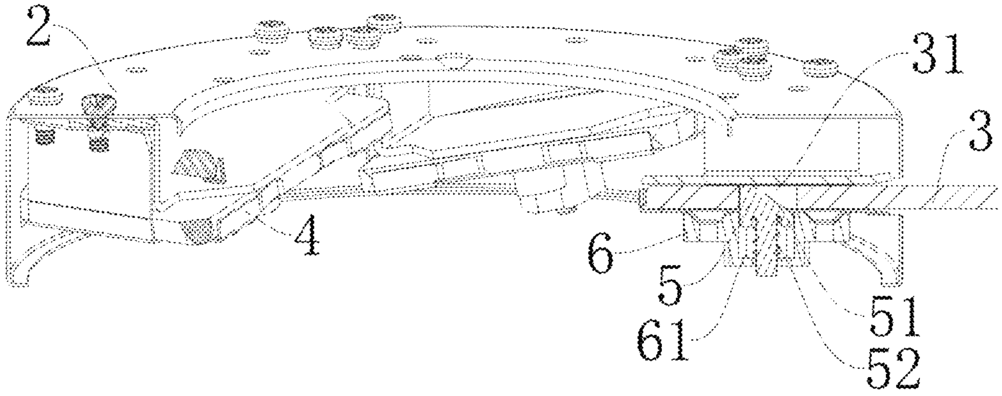
FIG. 6 is a schematic diagram 3 of the fan blade installation process provided in the embodiment of the invention.

In order to solve the problem in the prior art that an external fixing structure such as screws is required when installing the fan blade 3, referring to FIG. 3 and FIG. 6, the engagement member seat 6 is provided with a slot 61, the movable engagement member 5 slides up and down in the slot 61, a spring 52 for automatic reset is arranged between the movable engagement member 5 and the engagement member seat 6; by utilizing the elastic force of the spring 52, the fan blade 3 is fixed. In addition, a top of the movable engagement member 5 is provided with a slope-shaped engagement member inclined surface 51, the engagement member inclined surface 51 sequentially passes through the inclined press hole 41, the fan blade hole 31, and then abuts against the mounting inclined surface 21.

Preferably, the spring 52 adopts a helical spring.

Figure 5:
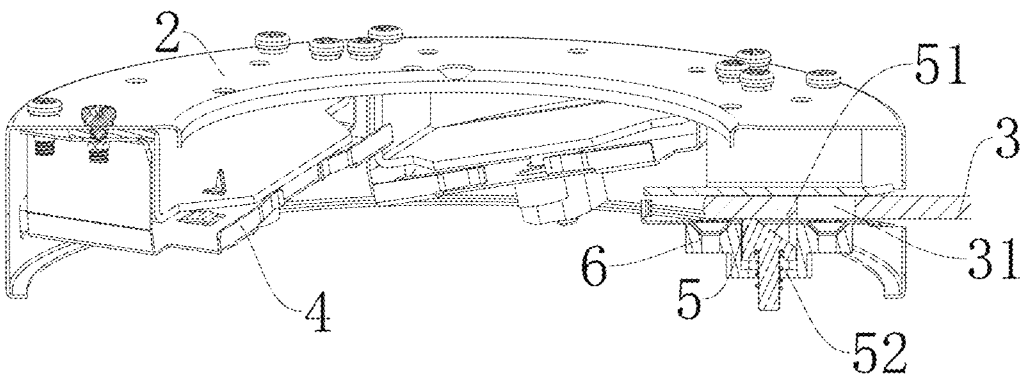
FIG. 5 is a schematic diagram 2 of the fan blade installation process provided in the embodiment of the invention.

When using the invention, referring to FIG. 4 to FIG. 6, are schematic diagrams of the process of inserting the fan blade 3 into the groove body between the inclined press cover 4 and the mounting inclined surface 21.

First, the fan blade 3 is inserted into the central ring 2 through the mounting inclined groove 22, and the fan blade 3 slides along the mounting inclined surface 21 until it contacts the engagement member inclined surface 51 of the movable engagement member 5, as shown in FIG. 4.

Next, the movable engagement member 5 is pressed to move to make room for the fan blade 3 to continue inserting, as shown in FIG. 5.

Finally, when the fan blade hole 31 slides to the position of the movable engagement member 5 with the fan blade 3, the movable engagement member 5 rebounds into the fan blade hole 31 and locks the fan blade 3, firmly securing the fan blade 3 in the central ring 2, completing the fixation, as shown in FIG. 6.

Obviously, the described embodiments are some, but not all embodiments of the invention. Based on the embodiments in this invention, all other embodiments obtained by those of ordinary skill in the art without making creative efforts shall fall within the protection scope of this invention. The structures, devices and operating methods not specifically described and explained in the invention shall be implemented according to conventional means in the art unless otherwise specified and limited.

The invention claimed is:

1. A quick-assembly and anti-falling structure for fan blades of a ceiling fan, comprising a main unit, a suspension part fixed above the main unit, and a central ring installed below or around the main unit, the main unit is provided with a motor, an inner side wall of the central ring is provided with mounting inclined surfaces, further comprising the fan blades, each respective mounting inclined surface is provided with a respective mounting inclined groove on an outer side wall of the central ring, each respective mounting inclined groove is arranged parallel and opposite to each respective mounting inclined surface, and one end of each respective fan blade is inserted into each respective mounting inclined groove;

each respective mounting inclined surface is provided with a respective inclined press cover, an engagement member base is fixedly arranged on the inclined press cover, the engagement member base is movably provided with a movable engagement member, each respective side of each respective fan blade is inserted between each respective mounting inclined surface and each respective inclined press cover, each respective fan blade is provided with a respective fan blade hole that is used in conjunction with and is movably connected to each respective movable engagement member;

each respective inclined press cover is provided with a respective inclined press hole, each respective top of each respective movable engagement member is provided with a respective slope-shaped engagement member inclined surface, each respective engagement member inclined surface sequentially passes through each respective inclined press hole, each respective fan blade hole, and then abuts against each respective mounting inclined surface.

2. The quick-assembly and anti-falling structure for fan blades of a ceiling fan of claim 1, wherein each respective engagement member base is provided with a respective slot, each respective movable engagement member slides up and down in each respective slot, a respective spring for automatic reset is arranged between each respective movable engagement member and each respective engagement member base.

3. The quick-assembly and anti-falling structure for fan blades of a ceiling fan of claim 2, one side of each respective inclined press cover is bent upward to form a respective first limiting surface, another side of each respective inclined press cover is bent upward to form a respective second limiting surface, the first limiting surface and the second limiting surface are fixedly arranged on a top of the central ring, each respective inclined press cover is installed parallelly below each respective mounting inclined surface through each respective first limiting surface and each respective second limiting surface, a respective groove body for fixing each respective fan blade is formed between each respective inclined press cover and each respective mounting inclined surface.

4. The quick-assembly and anti-falling structure for fan blades of a ceiling fan of claim 3, wherein each respective end surface of the inclined press cover located inside each respective the central ring is provided with respective limit blocks, and each respective limit blocks are located between each respective first limiting surface and each respective second limiting surface.

5. The quick-assembly and anti-falling structure for fan blades of a ceiling fan of claim 4, wherein each respective inclined press cover is also provided with respective through holes, each respective through holes are evenly distributed around each respective inclined press hole, each respective through hole is provided with a respective limit engagement member.

6. The quick-assembly and anti-falling structure for fan blades of a ceiling fan of claim 2, wherein the spring is a helical spring.

* * * * *